T. GARE.
PROCESS OF RECLAIMING OLD OR WASTE VULCANIZED INDIA RUBBER.
APPLICATION FILED SEPT. 17, 1906.

1,133,952. Patented Mar. 30, 1915.

Witnesses,
Alfred Bosshardt
Stanley E Bramall

Inventor,
Thomas Gare
Per F. Eckhardt,
Attorney.

UNITED STATES PATENT OFFICE.

THOMAS GARE, OF NEW BRIGHTON, ENGLAND.

PROCESS OF RECLAIMING OLD OR WASTE VULCANIZED INDIA-RUBBER.

1,133,952.  Specification of Letters Patent. Patented Mar. 30, 1915.

Application filed September 17, 1906. Serial No. 335,020.

*To all whom it may concern:*

Be it known that I, THOMAS GARE, subject of Great Britain, residing at New Brighton, in the county of Chester, Kingdom of Great Britain, have invented new and useful Improvements in the Process of Reclaiming Old or Waste Vulcanized India-Rubber, of which the following is a specification.

My invention has for its object to provide a partly mechanical and partly chemical process whereby old or waste vulcanized india rubber can be re-claimed, that is to say, converted into a homogeneous plastic mass ready for remanufacture or being made into a solution, very much quicker and cheaper than hitherto has been the case and without using de-sulfurizing agents or the rubber losing any of its properties.

When converting old or waste vulcanized india rubber in its manufactured form into a homogeneous plastic mass, it is subjected to the following contemporaneously conducted successive steps of operations, namely—First, being minced into pieces of a size approximately of from $\frac{1}{4}$ to $\frac{3}{8}$ of an inch by being forced through a mincing device. Second, being simultaneously minced and milled into smaller particles and a partly plastic state, by being forced from the said mincing device through one or more combined mincing and milling devices of successive finer grade. Third, being finally milled to a fine homogeneous plastic mass by being forced through a milling device only. During the said mincing operation the old or waste vulcanized india rubber is cut up and during the milling operation ground and dissolved into a plastic or liquid state, the devices used for this operation being preferably of the disk type, the disks having plain surfaces.

I attain these objects by the mechanism illustrated in the accompanying drawing which shows a form of machine by which my improved process may be carried out.

Figure 1:
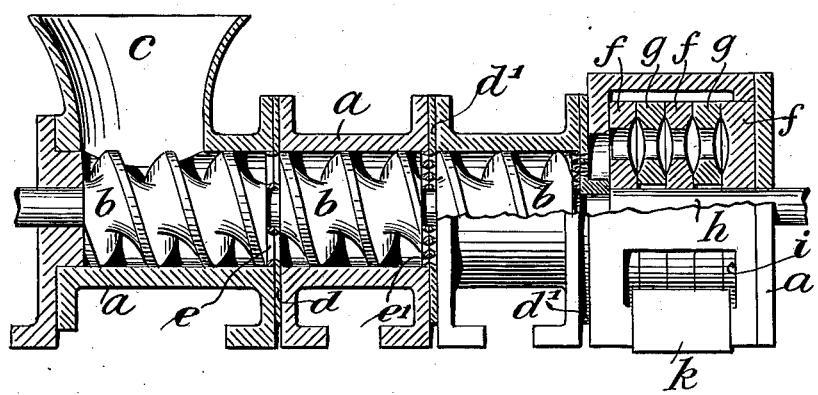
Figure 2:
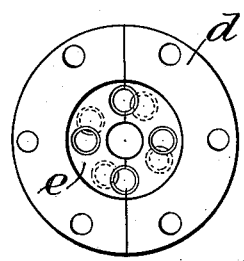

Figure 1 being partly a longitudinal section and partly an elevation, and Fig. 2 a detached cross section of the perforated disk.

Similar letters refer to similar parts throughout the various views.

*a* is the casing of the machine made in sections, *b* the feeding screw, *c* the hopper which supplies the screw *b* with the rubber to be treated.

Between the flanges of each casing sections are secured perforated disks *d, d'* secured to and adapted to rotate with the screw *b*, the perforations of each of the said sets of disks diminishing in size from the feed to the delivery end of the machine. In the end section of the machine a further series of disks are arranged, *f* of which are stationary and *g* secured to and adapted to rotate with the shaft *h*. The disks *d, e* serve to mince, the disks *d', e'* to mince and partly mill, and the disks *f* and *g* to finally mill the rubber into a fluid or plastic mass. The casing section containing the latter disks has an aperture *i* and scrapers *k* projecting through it to bear against the disks and thereby deliver the fluid or plastic mass produced.

When converting old or waste vulcanized india rubber reduced to a fine powder which at present is a commercial commodity, the first mincing and combined mincing and milling operations are dispensed with, while when using rubber reduced to a coarser grade, the said mincing operation will be entirely and the said combined mincing and milling operations partly dispensed with.

It may here be remarked that during the second step of operations the rubber is not only further reduced but at the same time partly brought into a plastic state while the last operation transforms it into a complete homogeneous plastic mass. During the afore-mentioned mincing and milling operations the rubber is subjected to indirect heat, and, also, to continuous pressure due to the action of screw *b*, this pressure serving to completely expel the air from the rubber and thus prevent any deterioration of the latter consequent upon the heat and rubbing. In order to facilitate the said operations, the old or waste vulcanized rubber to be converted into a plastic mass may be softened by boiling resin, benzolin of other suitable liquids previous to being subjected to the said operation, or the india rubber may be heated indirectly while under the various steps of operations, or again a suitable solvent may be mixed with it while being subjected to the first step of operation, which also serves as a lubricant in forcing the rubber through the various stages. The rubber being forced through the said devices, it is converted into a plastic condition very rapidly, say within from 5–15 minutes and the whole of the operations is continuous and very rapid, the rubber is not liable to become hard again during or between the various stages of the operations.

According to the consistency or quality of the plastic rubber to be produced from old or waste vulcanized rubber in the manner described or the use for which it is intended, suitable gums, mineral matter, pigments, benzolin, turpentine, naphtha may be mixed therewith during the first stage of the said operations.

I am aware that previous to my invention vulcanized rubber has been reduced to powder form by grinding and also to a plastic or liquid state by the treatment with pure alcohol and afterward ground in the usual way for re-manufacture, I therefore lay no claim to the reducing of vulcanized india rubber to a powder, plastic or liquid state by such means, but—

What I claim is—

The herein described process of reclaiming waste vulcanized rubber in its manufactured form, which consists in mincing lumps of rubber step-wise gradually into small pieces, and subsequently and progressively frictionally rubbing the said small pieces between resisting surfaces to convert said pieces into a highly plastic mass.

In testimony whereof I have signed my name to this specification in the presence of two subscribing witnesses.

THOMAS GARE.

Witnesses:
 ALFRED BOSSHARDT,
 STANLEY E. BRAMALL.